US011985106B2

(12) United States Patent
Bouvet et al.

(10) Patent No.: US 11,985,106 B2
(45) Date of Patent: May 14, 2024

(54) METHOD FOR MANAGING A REQUEST TO ACCESS AN INTERNET SITE FROM AN ACCESS DEVICE

(71) Applicant: Orange, Issy-les-Moulineaux (FR)

(72) Inventors: Eric Bouvet, Chatillon (FR); Fabrice Fontaine, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/908,088

(22) PCT Filed: Feb. 11, 2021

(86) PCT No.: PCT/FR2021/050251
§ 371 (c)(1),
(2) Date: Aug. 30, 2022

(87) PCT Pub. No.: WO2021/176156
PCT Pub. Date: Sep. 10, 2021

(65) Prior Publication Data
US 2023/0283586 A1 Sep. 7, 2023

(30) Foreign Application Priority Data
Mar. 2, 2020 (FR) ...................................... 2002081

(51) Int. Cl.
G06F 15/16 (2006.01)
H04L 9/40 (2022.01)
H04L 61/4511 (2022.01)

(52) U.S. Cl.
CPC ........ *H04L 61/4511* (2022.05); *H04L 63/108* (2013.01)

(58) Field of Classification Search
CPC ........................... H04L 61/4511; H04L 63/108
See application file for complete search history.

(56) References Cited

U.S. PATENT DOCUMENTS 7,769,766 B1 * 8/2010 Dubrovsky ........... G06F 16/957
707/754
9,661,108 B2 * 5/2017 Treuhaft ................. H04L 69/22
(Continued)

FOREIGN PATENT DOCUMENTS

EP 3113460 A2 1/2017
EP 3270573 A1 1/2018

OTHER PUBLICATIONS

International Search Report dated Apr. 16, 2021 for corresponding International Application No. PCT/FR2021/050251, filed Feb. 11, 2021.
(Continued)

Primary Examiner — Hieu T Hoang
(74) Attorney, Agent, or Firm — David D. Brush; Westman, Champlin & Koehler, P.A.

(57) ABSTRACT

A method for managing a request to access an internet site originating from a device and transmitted through a telecommunication network. The method includes: receiving a request including a domain name, originating from the device, intended to be transmitted to a domain name resolution server; routing the request to a domain name resolution server; receiving a response including an IP address and information, called first information, linked to the IP address; transmitting or not transmitting the request over the network as a function of the first information.

8 Claims, 2 Drawing Sheets

(56) References Cited

U.S. PATENT DOCUMENTS

| | | | | |
|---|---|---|---|---|
| 10,169,479 B2* | 1/2019 | Holloway | | H04L 63/126 |
| 2014/0156845 A1* | 6/2014 | Weaver | | H04L 63/0236 |
| | | | | 709/225 |
| 2014/0344925 A1* | 11/2014 | Muthiah | | H04L 61/4511 |
| | | | | 726/22 |
| 2015/0207809 A1* | 7/2015 | Macaulay | | G06F 21/577 |
| | | | | 726/22 |
| 2016/0021114 A1* | 1/2016 | Lu | | H04L 61/4511 |
| | | | | 726/1 |
| 2016/0080262 A1* | 3/2016 | Crasta | | H04L 61/58 |
| | | | | 709/238 |
| 2016/0380960 A1* | 12/2016 | Pandrangi | | H04L 67/563 |
| | | | | 709/224 |
| 2017/0012988 A1* | 1/2017 | Turgeman | | H04W 12/122 |
| 2017/0041333 A1* | 2/2017 | Mahjoub | | H04L 61/4511 |
| 2017/0323102 A1* | 11/2017 | Manadhata | | G06F 21/57 |
| 2018/0300475 A1* | 10/2018 | Zhang | | H04L 63/0272 |
| 2018/0351972 A1* | 12/2018 | Yu | | H04L 63/1416 |
| 2020/0128038 A1* | 4/2020 | Neystadt | | H04L 45/74 |
| 2020/0252374 A1* | 8/2020 | Bosch | | H04L 61/5007 |
| 2020/0252803 A1* | 8/2020 | Shah | | H04W 12/121 |
| 2021/0092134 A1* | 3/2021 | Ludwig | | H04L 63/1416 |
| 2021/0136037 A1* | 5/2021 | Balasubramaniam | | |
| | | | | H04L 61/4511 |
| 2021/0266185 A1* | 8/2021 | Konda | | H04L 61/4511 |

OTHER PUBLICATIONS

Written Opinion of the International Searching Authority dated Apr. 16, 2021 for corresponding International Application No. PCT/FR2021/050251, filed Feb. 11, 2021.

English translation of the Written Opinion of the International Searching Authority dated Apr. 26, 2021 for corresponding International Application No. PCT/FR2021/050251, filed Feb. 11, 2021.

French Search Report and Written Opinion dated Nov. 9, 2020 for corresponding French Application No. 2002081, filed Mar. 2, 2020.

* cited by examiner

[Fig. 1]
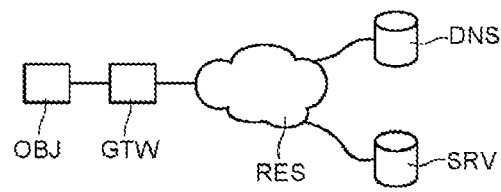
[Fig. 2]
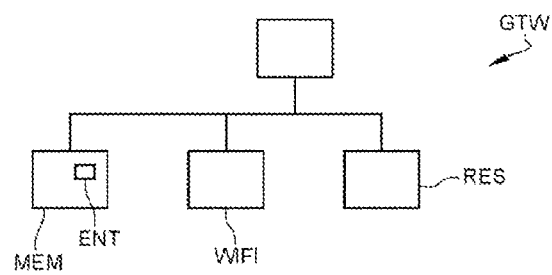
[Fig. 5]
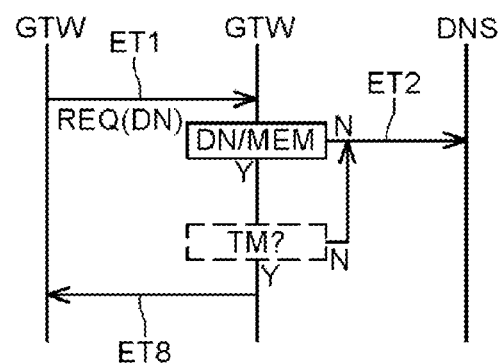

[Fig. 3]
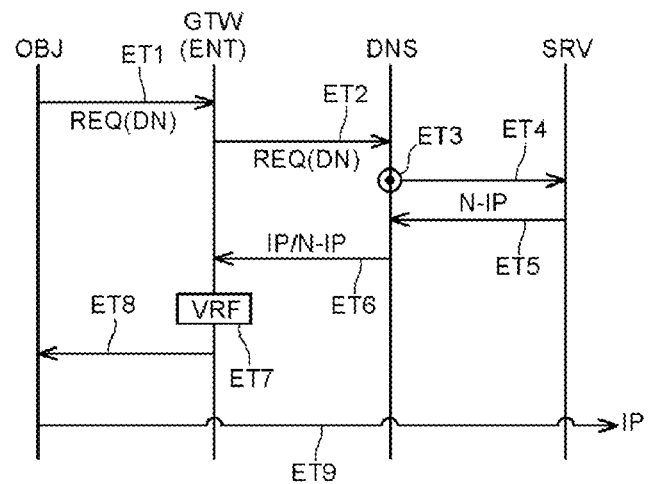
[Fig. 4]
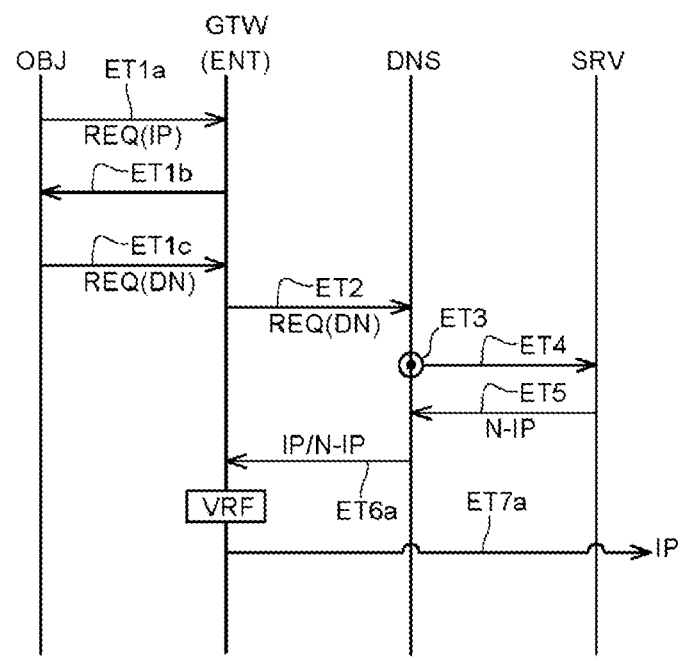

METHOD FOR MANAGING A REQUEST TO ACCESS AN INTERNET SITE FROM AN ACCESS DEVICE

CROSS-REFERENCE TO RELATED APPLICATIONS

This Application is a Section 371 National Stage Application of International Application No. PCT/FR2021/050251, filed Feb. 11, 2021, which is incorporated by reference in its entirety and published as WO 2021/176156 A1 on Sep. 10, 2021, not in English.

TECHNICAL FIELD

The invention relates to the field of telecommunications.

The invention relates more particularly to a method for managing access to a website from a data processing device, called access device hereinafter.

The access device chosen to illustrate the invention is a connected object.

BACKGROUND

Over the Internet, computers communicate with one another using a set of protocols, including the Internet Protocol (IP). This protocol uses numeric addresses, which are commonly called IP addresses (@IP).

Therefore, computers distributed in the network have an associated domain name of the type "example.com". This domain name has a corresponding URL (Uniform Resource Locator), which is the unique address for accessing a computer on the network, for example a server hosting a website.

There are two methods for accessing a website from an access device. A first access method is performed using the IP address, and a second method is performed using a URL.

When a URL is used, the access device transmits a request to a domain name resolution server or DNS (for "Domain Name System") server to retrieve the corresponding IP address. Once the IP address has been retrieved, the access device accesses the computer using the IP address.

Using an IP address instead of a URL allows the access device to access websites directly without requiring any preliminary DNS requests.

Regardless of the method that is used and referred to above, accessing websites exhibits certain risks. For example, the website may belong to a malicious third party capable of taking control of the access device without the knowledge of the owner of the access device. When the access device is a connected object, for example a vacuum cleaner equipped with a camera, the malicious third party may install, in the object, malware capable of transmitting data from the object to the Internet. Indeed, the malware installed on the object may command video capturing of the environment of the camera and transmit the resulting video content over the Internet.

The invention aims to improve the situation.

SUMMARY

To this end, according to one functional aspect, the invention relates to a method for managing a request to access a website originating from a device and transmitted through a telecommunications network, characterized in that it comprises the following steps, A step of receiving a request including a domain name, originating from a device, intended to be transmitted to a domain name resolution server;

A step of routing the request to a domain name resolution server;

A step of receiving a response including an IP address and information, called first information, linked to the IP address;

Depending on the first information, transmitting or not transmitting the request on the network.

According to the invention, an entity external to the access device intercepts requests to access websites and seeks to obtain both an IP address from a domain name resolution server and information relating to the IP address. Upon receipt of the information, the entity analyzes it and decides whether or not to follow through with the access request. It will be seen that, in one embodiment, when the entity decides to follow through, the IP address is transmitted to the access device at the origin of the request.

A domain name resolution server is located in a secure environment. The first information relating to the IP address is therefore stored in a trusted environment that is difficult for a malicious third party to attack. In addition, this trusted server ideally keeps the first information linked to the IP addresses up to date.

Finally, the entity is located outside the access device, ideally in a secure device such as a home gateway to which the access device is connected; the chances of both the access device and the home gateway being compromised are therefore very low.

It should be noted that "information" is understood to mean any descriptive information able to characterize a computer (or website), specifically its level of trust, a category of computer (site for children, for adults, etc.). Other examples of descriptive information will be described below.

Nowadays, as indicated above, access devices, such as connected objects, are able to access a website directly with an IP address, sometimes without a preliminary domain name resolution step performed by a domain name resolution server. According to a first particular mode of implementation of the invention, when the initial request includes an IP address of a device to be accessed, the reception step is preceded by a transmission step of transmitting, to the access device, a message requesting transmission of a request to a domain name resolution server. This embodiment forces the access device to perform a name resolution by way of a domain name resolution server, so as to retrieve information linked to the website that corresponds to the received domain name. After checking the received information, the management entity transmits or does not transmit the received request to the device associated with the IP address.

According to another, second, particular mode of implementation of the invention, which may be implemented as an alternative or in addition to the previous mode, the method furthermore comprises A step of obtaining information linked to the access device, called second information;

A step of comparing both the first and said second information;

Depending on the comparison step, transmitting or not transmitting the request on the network.

This mode bolsters security by taking into account information not only about the website in question, but also information about the access device. The management entity retrieves the information linked to the access device and the information linked to the website, and compares said information and detects any incompatibilities between the first and the second information before deciding whether or not to transmit the IP address. For example, the website may be an adult website while the access device is a children's game, and the entity in this case will decide not to follow through with the access request for reasons of incompatibility between the access device and the website to which access is being requested.

As the case may be, when there is incompatibility, the entity does not transmit:
- the IP address to the access device if the received initial access request is based on a domain name; or
- the request on the Internet if the received initial access request is based on an IP address.

According to another, third, particular mode of implementation of the invention, which may be implemented as an alternative or in addition to the previous ones, following the step of receiving a response including an IP address and information linked to the IP address, the received information is stored. In this configuration, in the present mode, the reception of a new subsequent access request is followed by a check for the presence of information linked to the domain name in memory, and transmission or lack of transmission of the IP address based on the information stored in memory.

It will be seen hereinafter that the steps described above are performed in a home gateway and that the received information linked to the IP address is stored in a memory of the home gateway.

According to another, fourth, particular mode of implementation of the invention, which may be implemented as an alternative or in addition to the previous ones, a validity period is associated with the stored information. In this configuration, the presence of information linked to the domain name in memory is followed by a check that the information is still valid. If not, the method performs the steps described above:
- A step of routing the request to a domain name resolution server;
- A step of receiving a response including an IP address and information linked to the IP address;
- Depending on the response, transmitting or not transmitting the request on the network.

According to another, fourth, particular mode of implementation of the invention, which may be implemented as an alternative or in addition to the previous ones, when the validity period has expired, the method comprises
- A step of transmitting, to a domain name resolution server, a request to obtain an update of the information associated with an IP address and stored in memory;
- A step of receiving a response including the information associated with the IP address, and
- A step of storing the received information.

This fourth mode has the advantage of updating the information stored in the gateway, for example as soon as said information is no longer valid. This makes it possible, when the entity receives an access request, to have valid information available. This avoids the entity having to transmit a domain name resolution request on the network. Having valid information stored in the gateway, the entity is therefore able to decide more quickly to authorize or not authorize transmission of the received access request to the IP address in question.

According to one hardware aspect, the invention relates to a management entity comprising
- A reception module for receiving a request including a domain name, originating from a device, intended to be transmitted to a domain name resolution server;
- A routing module for routing the request to the resolution server;
- A reception module for receiving a response including an IP address and information, called first information, linked to the IP address;
- a transmission module able to transmit or not transmit the request on the network depending on the first information.

According to another hardware aspect, the invention relates to a home gateway including the entity described above.

According to another hardware aspect, the invention relates to a computer program able to be implemented on a management entity such as defined above, the program comprising code instructions that, when it is executed by a processor, performs the steps of the method that are defined above.

Finally, the invention relates to a data carrier on which at least one sequence of program code instructions for executing the method defined above has been stored.

The data carrier may be any entity or device capable of storing the program. For example, the carrier may include a storage means, such as a ROM, for example a CD-ROM or a microelectronic circuit ROM, or else a magnetic recording means, such as a hard disk. Moreover, the information carrier may be a transmissible carrier such as an electrical or optical signal, which may be routed via an electrical or optical cable, by radio or by other means. The program according to the invention may in particular be downloaded from a network such as the Internet. As an alternative, the information carrier may be an integrated circuit into which the program is incorporated, the circuit being designed to execute or to be used in the execution of the method in question.

Lastly, it will be noted here that, in the present text, the term "module" or "entity" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

BRIEF DESCRIPTION OF THE DRAWINGS

The invention will be better understood on reading the following description, which is given by way of example and with reference to the appended drawings, in which:

FIG. 1 shows a computer system on which one exemplary embodiment of the invention is illustrated.

FIG. 2 is a schematic view of the architecture of a home gateway according to one embodiment of the invention.

FIG. 3 illustrates one example of steps implemented within the context of a method according to one embodiment.

FIG. 4 illustrates one possible variant of the embodiment described with reference to FIG. 3.

FIG. 5 illustrates another possible variant of the embodiment described with reference to FIG. 3.

DETAILED DESCRIPTION OF ONE OR MORE EXEMPLARY EMBODIMENTS ILLUSTRATING THE INVENTION

FIG. 1 shows an access device of a user OBJ able to access a communication network RES via an interface device GTW. The communication network RES may be the Internet and the interface device GTW may be a home gateway or a router allowing the terminal OBJ of a user to access the Internet. Access to the communication network is provided by a communication network access provider.

The access device OBJ may be any type of device configured to access a communication network such as the Internet via the home gateway GTW. The access device OBJ may be a cell phone or other mobile communication terminal, such as a tablet or a laptop computer, a desktop computer or a domestic appliance able to set up a connection with the communication network RES.

Generally speaking, when a user enters a domain name on the browser installed on an access device, a domain name resolution request is transmitted by the access device to a resolution server or DNS server.

The DNS server then responds to the access device 10 with a network address or "Internet Protocol" address corresponding to the domain name, the access device then being able to access the IP address via the home gateway GTW.

The home gateway GTW is an interface device allowing exchanges between the access device OBJ and the communication network RES. It acts, among other things, as a DNS relay. In other words, the gateway takes responsibility for sending the resolution requests REQ to DNS resolution servers. One possible architecture of the interface device will be described later with reference to FIG. 2.

It will be recalled here that it is necessary to obtain the IP address of the website in order to access it. In general, a website has one or more IP addresses (for example 93.184.216.34) and a domain name (www.example.com).

A domain name is translated into a numeric address by a DNS (acronym for "Domain Name System") domain name resolution server.

FIG. 2 illustrates a home gateway configured to implement the management method according to one particular embodiment of the invention.

According to this particular embodiment, the gateway has the conventional architecture of a computer and comprises in particular a processor CPU (or microcontroller), and a memory MEM in which, in which, an entity ENT is stored. In our example, the entity ENT is a computer program that comprises instructions for implementing the steps of the management method that will be described below with reference to FIG. 3 when the program is executed by the processor CPU.

The gateway furthermore comprises a module Wi-Fi and a module RES for communicating with a local area network such as a Wi-Fi network and a wide area network such as an ADSL, fiber, etc. network.

FIG. 3 illustrates a flowchart of the processing method according to a first embodiment of the invention.

In our example, the access device OBJ is a connected object.

When the connected object OBJ wishes to access the communication network RES via the home gateway GTW, the object OBJ 10, in a first step ET1, creates a resolution request REQ to resolve the domain name DN of a website that it wishes to access and transmits this resolution request REQ to the gateway GTW.

In a second step ET2, the home gateway GTW transmits the resolution request to the DNS server.

The DNS server then performs two tasks. A first task of obtaining, in a third step ET3, the IP address associated with the domain name; a second task of obtaining descriptive information about the IP address by interrogating the server SRV in a fourth step ET4, the descriptive information having the role for example of providing a confidence level N-IP associated with the device to which the resolved IP address corresponds. This information, called descriptive information, may be stored in the DNS server or stored on a server external to the DNS server. In a fifth step ET5, the DNS server obtains and transmits, to the entity ENT, the obtained descriptive information N-IP about the IP address in question.

This descriptive information may be diverse and varied. Descriptive information may be a type of website associated with the IP address: social network, video games, cryptomining, etc.

Other descriptive information may be the geographical location of the server: China, Russia, United States, Brazil, France Other descriptive information may be a confidence score associated with the IP address, for example given on a scale of one to ten.

In a sixth step ET6, the gateway receives the response from the DNS server, the response including the resolved IP address and a set of descriptive information associated with the IP address.

It is assumed here, to simplify the exemplary embodiment, that the received set of descriptive information is a confidence level N-IP provided in the form of a confidence score on a scale of 1 to 10, for example 9 for the website in question.

In a seventh step ET7, the management entity ENT receives the response, checks VRF the received information N-IP and decides to transmit the IP address to the object based on the received descriptive information, in our example the received confidence score.

It is assumed here that the entity transmits the IP address only if the confidence score is greater than or equal to 7. In this example, with the score received by the entity ENT being 9, the entity transmits the IP address to the object in an eighth step ET8.

Had the score received from the DNS server been a score lower than 7, the entity would not have transmitted the IP address.

After receiving the IP address, the object OBJ accesses the website having the received IP address.

According to a first variant, the access request is based on an IP address instead of a domain name.

With reference to FIG. 4, if the object OBJ wishes, in a step ET1a, to access a website via a URL address instead of a domain name, a request REQ(IP) is transmitted from the object OBJ to the entity ENT. Upon receipt of the request REQ(IP), instead of transmitting a request as in step ET2 described above, responds to the object OBJ in a step ET1b, by asking the object to transmit an access request to the website using a domain name.

In a subsequent step ET1c, the object OBJ transmits, in return, an access request REQ(DN) to access the website using a domain name.

The entity receives the access request.

At this stage; the method again takes place as described above from step ET2 to step ET6.

Next, in a sixth step ET6a, the management entity ENT receives the response, checks VRF the received information N-IP and decides to transmit the IP address to the object based on the received descriptive information, in our example the received confidence score.

It is assumed again here that the entity transmits the IP address only if the confidence score is greater than or equal to 7.

In this example, with the score received by the entity ENT being 9, the entity transmits the received request on the Internet, in a seventh step ET7a, to the website having the IP address.

According to a second variant, the method takes into account information linked to the connected object when making a decision. In this configuration, the entity ENT takes into account not only descriptive information relating to the website that the object OBJ wishes to access, but also descriptive information about the object OBJ itself.

Descriptive information about the object may be of any kind. For example, the descriptive information is a category of user likely to be using the object: child/adult, or a category of object (toy, video game for children or adults, "IoT" (for "Internet of Things") object such as a camera or a refrigerator, etc.).

The object is for example a connected game for children (a stuffed toy, an electric car for children, etc.).

In this configuration, the entity ENT compares the received information relating to the website with the information relating to the object. The entity detects any incompatibilities between the object and the website. For example, if the website is an adult site, without being malicious, and the user category of the object is "child", the entity ENT does not transmit the IP address to the object or does not transmit the access request as the case may be.

In the same way, if the website is a crypto-mining site (that is to say a site for "mining" cryptocurrencies), and the object is of the "IoT" type, the entity ENT does not transmit the IP address to the object or does not transmit the access request as the case may be.

A confidence level may also be assigned to the object OBJ. In this case, the entity may use this confidence level to decide whether or not to transmit the IP address.

According to one embodiment, the descriptive information received from the resolution server is stored in the memory MEM of the gateway GTW. It is also possible to set a period TM beyond which the information expires.

In this configuration, when an access request based on a domain name is received, the entity ENT checks whether this domain name DN has already been resolved by consulting the memory of the gateway (step DN/MEM).

If not, steps ET2 and those that follow are carried out again.

If so, optionally, with reference to FIG. 5, the validity of the descriptive information is checked by the entity (step TM?).

If the data are no longer valid because the validity period has expired, steps ET2 and those that follow are carried out again.

If the data are valid, steps ET8 or ET7a are carried out according to the use case defined above. Only step ET8 is shown in FIG. 5.

According to another variant, when the information linked to an IP address, stored in memory in the home gateway, has expired and is therefore no longer valid, the entity ENT transmits a domain name resolution request in order to obtain the latest updated descriptive information.

More precisely, when the information is no longer valid, this embodiment comprises the following steps:

A step of transmitting, to a domain name resolution server, a request to obtain an update of the information associated with an IP address and stored in memory, A step of receiving a response including the information associated with the IP address, and A step of storing the received information.

In this variant, the trigger for the transmission of a resolution request is not the reception of a request, originating from the access device, to access a domain name DN, but a state of the descriptive information stored in memory, more precisely expiry of the descriptive information.

Finally, to conclude, it is specified here that "descriptive information" refers to data able to characterize an object or a remote server.

Descriptive information relating to the object is for example permissions and/or metadata known to the home gateway, the latter keeping the connected objects to which it is connected up to date.

The permissions refer for example to an administrator, a normal user, etc.

The metadata relates for example to
- a type of equipment: Camera, PC, Telephone, Tablet, Printer, TV
- a confidence level such as a confidence score: 0-10
- a type of equipment: dangerous, non-secure, parental, social network, video games
- a category of equipment/software: dangerous/not dangerous; dangerous software is known to include for example crypto-mining software that uses the processing power of a peripheral for the purpose of generating cryptocurrency. These websites may be used legitimately by the user of the object, but are also used illegitimately by malicious third parties.
- a country of origin: China, Russia, United States, France, etc.

Although the present disclosure has been described with reference to one or more examples, workers skilled in the art will recognize that changes may be made in form and detail without departing from the scope of the disclosure and/or the appended claims.

The invention claimed is:

1. A management method, comprising:
   receiving a first request to access a website originating from a device and transmitted through a telecommunications network,
   if the first request includes an IP address of the website, transmitting to the device a message requesting transmission of a second request including a domain name of the website;
   after reception in return of the second request including the domain name of the website, transmitting the second request to a domain name resolution server;
   receiving, from the domain name resolution server, a response including the IP address and first information linked to the IP address; and
   depending on the first information, transmitting or not transmitting the second request to a server hosting the website.

2. The management method as claimed in claim 1, further comprising:
   obtaining second information linked to the device;
   comparing the first information and the second information; and depending on a result of the comparing, transmitting or not transmitting the second request to the server.

3. The management method as claimed in claim 1, further comprising:
following receiving the response including the IP address and the first information linked to the IP address, storing the received information in association with the domain name in a memory, and
upon receiving a new access request to the website, checking for presence of the received information associated with the domain name in the memory, and transmitting or not transmitting the IP address to the device based on the stored information.

4. The management method as claimed in claim 3, wherein a validity period is associated with the stored information.

5. The management method as claimed in claim 4, wherein when the validity period has expired: transmitting, to the domain name resolution server, a request to obtain an update of the stored information associated with the IP address, receiving a response including the update of the stored information associated with the IP address, and storing the received update of the stored information.

6. A management entity, comprising:
a processor; and
a non-transitory computer readable medium comprising instructions stored thereon which when executed by the processor configure the management entity to:
receive a first request to access a website originating from a device;
if the first request includes an IP address of the website, transmit to the device a message requesting transmission of a second request including a domain name of the website;
after reception in return of the second request including the domain name of the website, transmit the second request to a domain name resolution server;
receive, from the domain name resolution server, a response including the IP address and first information linked to the IP address; and
transmit or not transmit the second request on the network to a server hosting the website, depending on the first information.

7. A home gateway comprising the management entity as defined in claim 6.

8. A non-transitory computer-readable medium on which at least one sequence of program code instructions is stored for executing a management method when the instructions are executed by a processor of a management entity, wherein the management method comprises:
receiving a first request to access a website originating from a device and transmitted through a telecommunications network;
if the first request includes an IP address of the website, transmitting to the device a message requesting transmission of a second request including a domain name of the website;
after reception in return of the second request including the domain name of the website, transmitting the second request to a domain name resolution server;
receiving, from the domain name resolution server, a response including the IP address and first information linked to the IP address; and
depending on the first information, transmitting or not transmitting the second request to a server hosting the website.

* * * * *